Aug. 18, 1936.　　　　E. E. LEICHTER　　　　2,051,303
CONTINUOUS BREAD TOASTING MACHINE
Filed Feb. 8, 1936　　　2 Sheets-Sheet 1

INVENTOR.
EDWARD E. LEICHTER
BY
Miller Boykin & Bried
ATTORNEY.

UNITED STATES PATENT OFFICE 2,051,303

CONTINUOUS BREAD TOASTING MACHINE

Edward E. Leichter, San Francisco, Calif., assignor to Langendorf United Bakeries, Inc., San Francisco, Calif., a corporation of Delaware Application February 8, 1936, Serial No. 62,981

4 Claims. (Cl. 53—5)

This invention relates to devices for toasting slices of bread and has for its principal object a machine or apparatus for making toast in large quantity for commercial production of thin dry toast of the zwieback order, or what is generally known as Melba toast. A particular object of the invention is to provide such an apparatus which will be adapted to operate continuously in receiving bread slices at one point and discharging the finished toast at another point. Another feature is to provide means for automatically oiling or greasing the toasting "irons" or plates preparatory to the introduction of the slices of bread. Another object is to provide a simple means of heating the toasting plates to brown the toast yet provide sufficient time thereafter for the toast to become dried out without burning. Still another feature is to provide such an apparatus all enclosed in a case and vented in a manner to keep the feeding end comparatively cool so as to facilitate the work of the person feeding bread slices to the machine. Other features and advantages of the apparatus will appear in the following description and accompanying drawings.

In the drawings Fig. 1 is a side view of the enclosed apparatus or machine with portion of the near wall broken away at the feeding end of the machine to show the mechanism therein, and also with one pair of the toasting plates shown in cross section.

Fig. 3 is an enlarged top plan view of one of the lower toasting plates.

Fig. 4 is an enlarged top plan view of one of the upper toasting plates.

Figure 1:
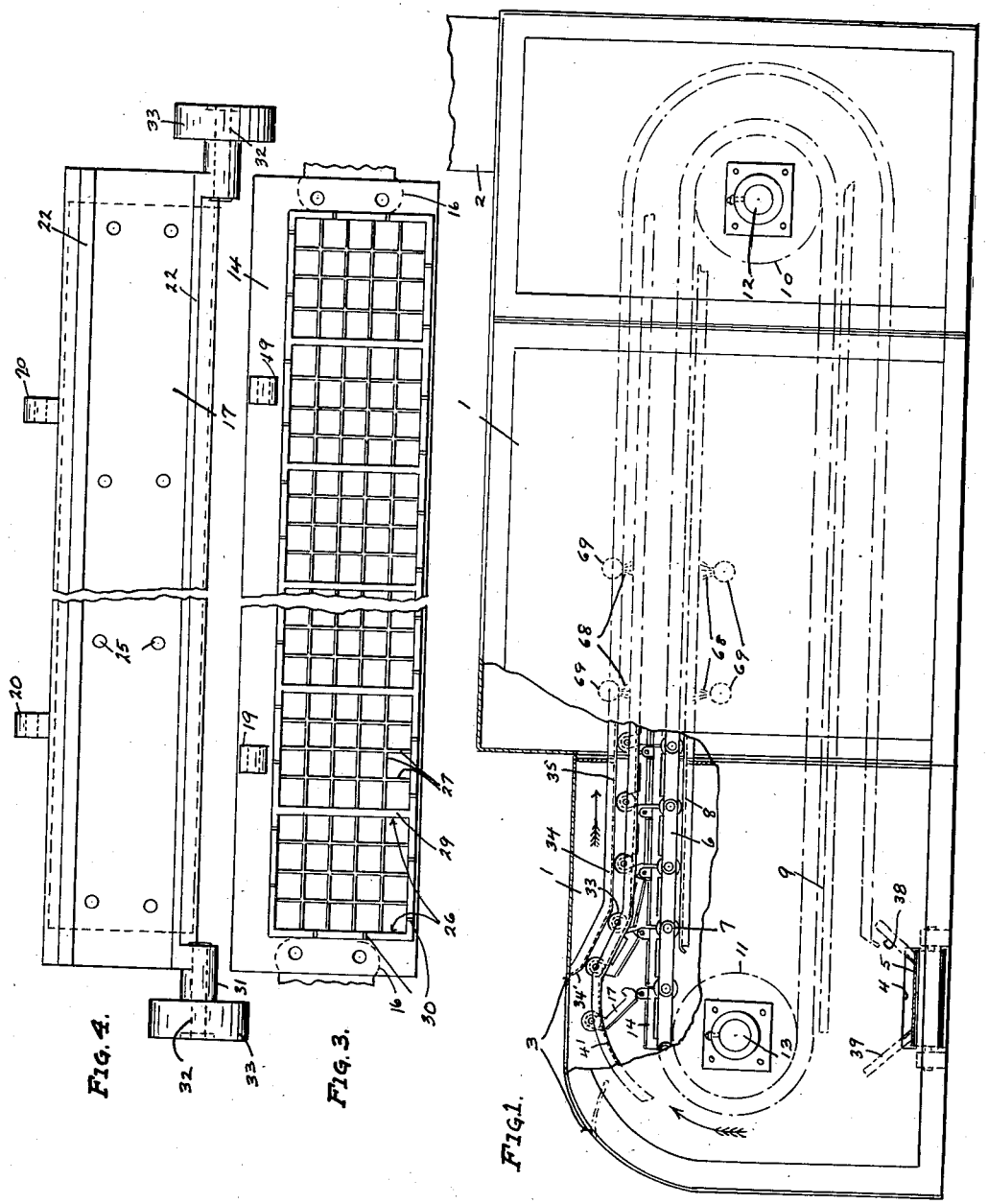

Briefly described the machine comprises a plurality of pairs of toasting plates, each pair hingedly connected together like a waffle iron or the common sandwich toaster so as to brown both sides of the slice simultaneously, and which toasting plates are arranged on endless carrier chains in the form of a conveyor, and automatically opened at one point of travel of the conveyor to receive the bread slices, closed for toasting the same, and again opened for discharging the finished toast. The toasting plates pass through gas flames immediately after being closed, and thereafter travel a considerable distance, relatively speaking, to permit the bread to absorb the heat imparted by the flame and drive out most of the moisture so as to make a well dried out toast of the zwieback type, or what is generally known as "Melba" toast when made of common bread.

In the drawings, 1 is a sheet metal casing or enclosure fitted at one end with a venting flue 2 at one end which may connect to a chimney, not shown, and which casing has an opening 3 adjacent the opposite end for introduction of the bread slices, while near the bottom of the casing adjacent the same or feeding end of the machine is a side opening 4 through which operates a discharge belt or conveyor 5 for carrying away the finished toast, though it is evident that if the casing is mounted high enough the product may fall from the machine to be guided by a chute to any desired point.

The endless chain conveyor for the toasting plates consists of two strands 6, 6', here shown as roller chain of conventional type and with the rollers 7 supported to roll along angle iron tracks 8 on the upper run and similar tracks 9 on the lower run, and the chains passing over wheels or sprockets 10 and 11 at the head and tail ends of the conveyor respectively mounted on shafts 12 and 13 supported in suitable bearings and with the head shaft projecting from the casing for connection to any suitable drive.

The two strands of chain are laterally spaced about three feet and connected together by the lower main toasting plates 14 which are secured at opposite end margins at 15 to attaching lugs 16 (known as A2 attachments) as indicated in Fig. 3. The upper main toasting plate 17 is hingedly or pivotally connected to the lower plate by pins 18 passing through lugs 19, 20 on the respective plates so that the plates are free to be opened just like any waffle iron.

The main toasting plates 14 and 17 are preferably heavy iron castings both longitudinally ribbed as at 21 and 22, respectively, and each is preferably respectively faced with an aluminum plate 23, 24 for contacting the bread slices. These aluminum plates are secured to the main plates as by screws 25 and each is partitioned off to form several shallow compartments 26 each to receive a slice of bread and each is preferably formed on its face with some slightly raised design as indicated at 27 so as to impress or burn an attractive design on the surface of the toast as done on waffles and also commonly done on many types of hard-baked crackers. The rim 29 forming the shallow compartments need not extend clear around each compartment though it makes it easier for an operator to position the slices if it does, though for mechanical feeding it will suffice to have it at the opening edges of the toasting plates only, as its object is to prevent undue crushing of the bread slices, by forming a limit stop when the plates are closed by a cam track arrangement to be described, hence it may consist of a couple of short sections of rim or in effect small lugs on one or both plates equal in total spacing to the ultimate thickness of toast desired.

If the rim extends around the slice-receiving depressions it may advantageously have some small notches in it as at 30 for steam and gases evolved in the toasting to escape.

To automatically open and close the hinged toasting plates the upper plates have upwardly extending lugs 31 at opposite ends at the rear or free edge of each plate and which lugs are fitted with outwardly projecting pins 32 rotatably supporting idler rollers 33. Idler rollers 33 are, along the main run of the conveyor, engaged by the laterally projecting flange 34 of angle bar tracks 35 secured along the opposite walls of the casing 1 in a manner to hold the toasting plates closed, the upper ends of the tracks being slanted upwardly as at 34' to receive the rollers from the open position of the toasting plates and force them to close as the conveyor moves forward, or to the right in Figs. 1 and 2.

Tracks 35 parallel the chain travel along the upper run of the conveyor, around the head sprockets, and along the lower run to a point near the tail sprockets 11 where the tracks terminate and are fitted with an angularly disposed plate 36 which functions to guide the finished pieces of toast 37 as they fall from the toasting plates when the plates open due to the outer one (17) falling to vertical position upon termination of the supporting tracks 35. Two additional guide plates 38, 39 may be arranged to insure guiding the toast to a transversely extending conveyor belt 5 for removing the finished toast from the machine.

If not restrained in some way the freely pivoted upper or outer toasting plates 17 would swing to closed position again when going over the tail sprockets 11, and to hold the toasting plates open for insertion of the next charge of bread slices I provide on opposite side walls of the machine a specially curved angle iron track 41 which engages under the advancing rollers 33 and guides the rollers outwardly until the upper plate is lifted to open position, and after which the rollers 33 engage under the upwardly slanted ends 34' of tracks 35 to again close the plates as described.

Figure 2:
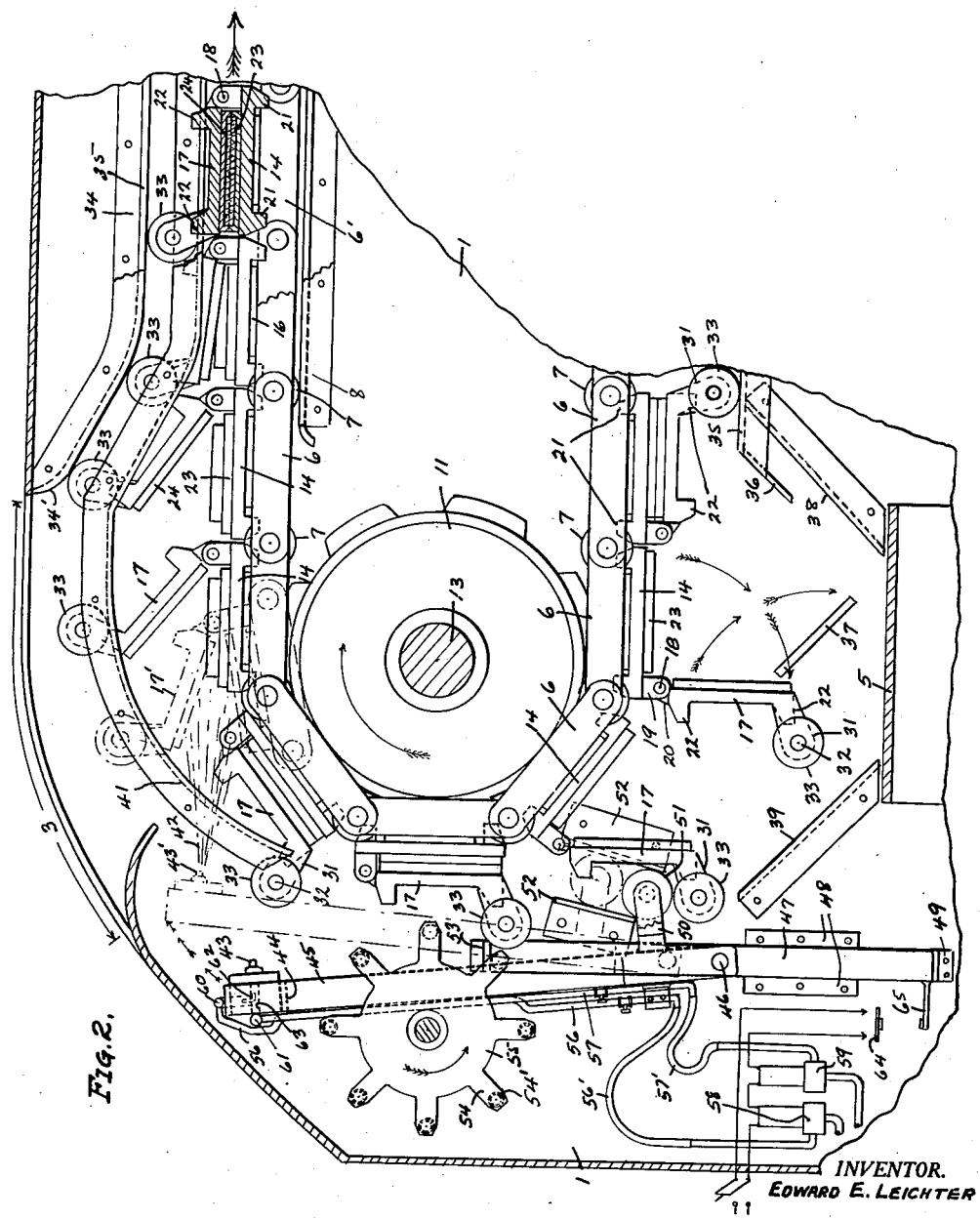
Fig. 2 is an enlarged detail of the mechanism at the feeding end of the machine.

When plate 17 is fully open as shown in Fig. 2, an attendant may place the slices of bread on the plates by operating through opening 3, or the bread slices may be introduced by any desired form of mechanical feeder, not shown. Just before the position at which the bread is introduced to the toasting plates, their faces are preferably sprayed with an atomized momentary blast of oil, or suitable fat in molten or liquid condition, to prevent the toast from sticking. Such a blast of oil is indicated in Fig. 2 at 42 directed between the open plates as indicated in an intermediate dotted position 17' just before the loading position, or next full line position to the right.

To actuate the oil blast automatically, a row of oil blast nozzles 43 is mounted on a transverse bar 44 secured to the upper ends of two upright bars 45 pivoted at their lower ends as at 46 to vertically slidable members 47 respectively at opposite side walls of the casing 1 and guided for vertical movement by guides 48 secured to the walls of the casing. Members 48 normally rest at their lower ends on stops as at 49 secured to the casing, and at least one of said members is provided with a forwardly extending arm 50 carrying an idler roller 51 which lies adjacent one of the side walls of the casing and is guided between two short angle iron guide plates 52 secured to the wall of the casing and so arranged that upon members 47 being lifted a short distance the action of the guides 52 will cause the row of spray nozzles 43 to swing upward and forward to dotted position 43'.

To thus lift members 47 inwardly projecting lugs 53 are provided at the upper ends of these members which are successively engaged from below by the teeth 54 of star wheels 55, one rotatably mounted at opposite sides of the casing, and which teeth are also engaged one after another by rollers 33 of the upper toasting plates as they pass by the star wheels. The actual contact of teeth 54 with lugs 53 is effected by laterally projecting pins, bosses or rollers 54' carried by the teeth.

In operation, each roller 33 will engage under a tooth 54 of the star wheel 55 and displace it to the position of the next tooth above, and during this fractional revolution of the star wheels their small rollers or pins 54' will engage under lugs 53 to lift members 47 until the pins 54' swing on their arc of travel sufficiently to clear lugs 53 and permit members 47 and consequently the spray nozzles to fall again to bring members 47 against stops 49. It is understood that the various rollers, guides, star wheels and other parts are preferably duplicated at both sides of the casing and that they are suitably displaced laterally relative to one another or "offset" to clear where required.

When the spray nozzles 43 are at about highest position, means is provided for momentarily operating the oil blast. This means may take any of a variety of forms such as mechanically tripped valves engaged at the right instant by any of the moving parts of the machine, or electrically operated valves, the circuit contacts of which are closed or opened by such moving parts, the electrical form of valve being here shown merely for convenience of illustration.

With reference to Fig. 2 the entering oil feed and compressed air pipes are indicated at 56, 57 respectively, each fitted with an electric solenoid valve 58, 59 and the pipes continuing as flexible tubes 56'—57' for a distance and then along member 45 to connect with small pipe headers 60, 61 which connect respectively with the oil jets 62 and air blast inlet 63 of the nozzles. The air and oil are under pressure and the solenoid valves are opened for a moment only by closing of the electric circuit switch 64 by means of a tripping finger 65 secured to member 47 arranged to close the switch at the moment of its highest position when periodically lifted as the rollers 33 of the toasting plates actuate the star wheel. Small control valves 66, 67 are preferably installed on the air and oil feed between the electric valves and the jets for accurate control of the spray or atomized blast of oil. The casing is fitted with a suitable door or removable panel, not shown, to make the mechanism accessible for adjustment and oiling.

With some forms of toast, of the type which is dipped prior to toasting, such as the French toast so called, if the dipping bath contains sufficient shortening, the oil spray may be rendered inoperative by simply switching off the electric current.

In operation the upper run of toasting plates moves to the right as seen in Figs. 1 and 2 and both upper and lower plates are heated by rows of gas jets 68, from burner pipes 69 extending across, above and below the upper run of the conveyor. These burners are situated close to the point at which the bread slices are introduced and as will be seen from Fig. 1 the toasting plates travel a relatively long distance after the maximum heat is applied before the toast is discharged to conveyor 40 for the purpose explained.

Since the venting flue 2 is at the remote end of the casing from the feed opening 3 the products of combustion are drawn away from the opening and hence any operator working over it.

Instead of gas heating, electric or other forms of heating may be used if arranged to carry out the objectives described.

If a very thin slice of bread were placed in the compartment of a pair of toasting plates it is manifest that it would brown more on the lower side where it was in contact with the plate, and therefore it is desirable that the slices of bread be somewhat thicker than the toasting compartment spaces so that they will be compressed between the plates, as are waffles or sandwiches in the ordinary double plate toasters, and thus result in a more even and firmer product. The rims or stops on the plates, however, limit the compression of the bread so as to prevent forming too thin and hard a slice of toast, or any wafer or cracker-like result which would be objectionable, as the characteristics of an evenly browned, compact, moderately thin piece of dry toast is the ideal product desired. Also it is manifest that the heat of the burner and speed of travel of the conveyor must be adjusted so as not to burn the toast.

Having thus described my improved bread toasting machine or apparatus, it will be evident that minor changes may be made by anyone skilled in the art to which it appertains without departing from the spirit of the invention and within the scope of my appended claims.

I claim:

1. A toast-making machine comprising an enclosed casing having a feed opening, an endless traveling conveyor within said casing, a series of toasting plates carried by said conveyor, a second series of toasting plates provided with means hingedly connecting them respectively to the first series of plates, means for automatically opening the plates at a point adjacent the feed opening to receive sliced bread as the conveyor operates, means for momentarily injecting liquid grease to the toasting surfaces of the plates when same are open, means automatically operating the grease-injecting means, means for closing the plates and holding same closed during the major travel of the plates, and means for automatically opening the plates for discharging the toasted product.

2. In a continuous type of bread toasting machine, an endless horizontally disposed traveling belt of upper and lower hinged toasting plates adapted to embrace opposite sides of slices of bread to be toasted, means automatically opening the plates at one end of the belt for feeding bread slices thereto, a series of oil blast nozzles adjacent the plates as they come around the feeding end of the conveyor, a movable frame upon which said nozzles are mounted, means impinged by the plates as they come around arranged to move said frame upwardly and forwardly for directing said nozzles adjacent the open plates, means for conveying oil and air under pressure to said nozzles and means actuated by the moving parts of the machine arranged for momentarily releasing said air and oil through said nozzles for actuating the blast.

3. In a continuous type of toasting machine, a horizontally disposed traveling belt of upper and lower toasting plates adapted to embrace opposite sides of slices of bread placed between the plates, pair of tracks along which the plates travel, rollers supporting the plates on said tracks, a second pair of tracks spaced from the first mentioned tracks, and rollers on the upper plates bearing on said second pair of tracks for holding the plates closed together as they travel along.

4. A toast-making machine comprising a horizontally disposed endless chain conveyor, a casing forming an oven enclosing the conveyor vented for combustion gases at one end and having a feeding opening at the opposite end, a series of pairs of toasting plates carried by the chain conveyor, means mounting said plates for relative movement for opening to receive therebetween slices of bread for toasting, means automatically opening said plates on the upper run of the conveyor to receive the bread actuated by the motion of the conveyor, means for automatically closing the plates upon the bread after passing said feeding opening, and means operative on the plates on the lower run of the conveyor for opening the same for gravity discharge of the toasted bread slices.

EDWARD E. LEICHTER.